US009482157B2

(12) United States Patent
Nilsson et al.

(10) Patent No.: US 9,482,157 B2
(45) Date of Patent: Nov. 1, 2016

(54) BIFURCATION FIRE PURGE SYSTEM FOR A GAS TURBINE ENGINE

(71) Applicant: UNITED TECHNOLOGIES CORPORATION, Hartford, CT (US)

(72) Inventors: Cody A. Nilsson, Jupiter, FL (US); Robert B. Fowler, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 467 days.

(21) Appl. No.: 14/181,829

(22) Filed: Feb. 17, 2014

(65) Prior Publication Data
US 2015/0121894 A1 May 7, 2015

Related U.S. Application Data

(60) Provisional application No. 61/770,412, filed on Feb. 28, 2013.

(51) Int. Cl.
F02C 7/25 (2006.01)
B64D 45/00 (2006.01)
A62C 3/08 (2006.01)
F02C 6/08 (2006.01)

(52) U.S. Cl.
CPC . F02C 7/25 (2013.01); A62C 3/08 (2013.01); B64D 2045/009 (2013.01); F02C 6/08 (2013.01)

(58) Field of Classification Search
CPC .............. F02C 7/25; F02C 6/08; F02C 9/18; B64D 2045/009; B64D 37/32; A62C 3/08; F23D 14/82; F23D 14/825; F23D 2209/10
See application file for complete search history.

(56) References Cited

U.S. PATENT DOCUMENTS

| | | | | |
|---|---|---|---|---|
| 2,353,765 A | * | 7/1944 | Mathisen | A62C 3/08 137/625.5 |
| 4,643,260 A | * | 2/1987 | Miller | A62C 3/08 169/46 |
| 4,811,793 A | * | 3/1989 | Lokken | A62C 3/08 169/48 |
| 5,458,343 A | | 10/1995 | Dornfeld et al. | |
| 6,216,791 B1 | | 4/2001 | Alhamad | |
| 6,802,479 B2 | * | 10/2004 | Howe | B64D 37/00 244/129.1 |
| 7,010,906 B2 | | 3/2006 | Cazenave et al. | |
| 7,434,451 B2 | | 10/2008 | Smith | |
| 7,819,359 B2 | | 10/2010 | Chaniot | |
| 7,918,081 B2 | | 4/2011 | Schlichting et al. | |
| 8,087,674 B2 | | 1/2012 | Cummings | |
| 2003/0126854 A1 | | 7/2003 | Cazenave et al. | |

* cited by examiner

Primary Examiner — William H Rodriguez
(74) Attorney, Agent, or Firm — Carlson, Gaskey & Olds, P.C.

(57) ABSTRACT

A bifurcation assembly for a gas turbine engine is disclosed and includes a housing defining an inner cavity. A first partition and a second partition extend across the inner cavity and define a buffer area therebetween. Openings through the first and second partitions define passageway for supply conduits. A control device governs the flow of a purge gas into the buffer area for blocking the spread of fire. The purge gas provides a barrier to the spread of fire and heat through the bifurcation assembly.

16 Claims, 5 Drawing Sheets

BIFURCATION FIRE PURGE SYSTEM FOR A GAS TURBINE ENGINE

CROSS REFERENCE TO RELATED APPLICATION

This application claims priority to U.S. Provisional Application No. 61/770,412 filed on Feb. 28, 2013.

BACKGROUND

A gas turbine engine typically includes a fan section, a core engine section including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A nacelle provided around the gas turbine engine will include an inner nacelle structure around the core engine and an outer nacelle disposed about the fan section. A bypass passage is defined within a generally annular passage disposed between the core engine, the fan case and/or nacelle structures. Structures referred to as bifurcations extend from the core engine section to provide structural support and define a passageway for electrical wires and fluid conduits routed to the core engine. The bifurcation obstructs a portion of the passageway and therefore is provided with a minimal cross-section to limit disruption to the airflow.

Bifurcations are required to have firewalls that isolate the core engine from the fan case, outer nacelle and aircraft wing structure. Accordingly, each conduit through the bifurcation is jointed with fireproof connectors at a firewall. Each connector is much larger than the corresponding conduit and therefore results in larger bifurcations. Space in the bifurcation is limited and therefore engine manufactures continue to pursue alternate methods and configurations to isolate the engine core from other structures of an aircraft.

SUMMARY

A bifurcation assembly for a gas turbine engine according to an exemplary embodiment of this disclosure, among other possible things includes a housing defining inner cavity, a first partition extending across the inner cavity, a second partition extending across the inner cavity spaced apart from the first partition to define a buffer area therebetween, at least one openings through the first partition and the second partition defining a passageway for a supply conduit, and a control device governing the flow of a purge gas into the buffer area blocking the spread of fire through the buffer area.

In a further embodiment of the foregoing bifurcation assembly, includes a grommet within the opening and in communication with the buffer area for communicating purge gas into the passageway for the supply conduit.

In a further embodiment of any of the foregoing bifurcation assemblies, one of the first partition and the second partition include a plurality of openings in communication with the buffer area for communicating purge gas to a side opposite the buffer area.

In a further embodiment of any of the foregoing bifurcation assemblies, includes a fire retardant material supported within the housing that is activated in response to heat to produce a flame retardant gas.

In a further embodiment of any of the foregoing bifurcation assemblies, the fire retardant material is supported on an inner periphery of the housing within the buffer area.

In a further embodiment of any of the foregoing bifurcation assemblies, the control device includes a valve that moves to an open position allowing a flow of purge gas into the buffer area responsive to a temperature detected that is indicative of a fire.

In a further embodiment of any of the foregoing bifurcation assemblies, the control device includes a fixed orifice blocked by a plug that melts responsive to exposure to heat above a defined temperature for communicating the purge gas to the buffer area.

A gas turbine engine according to an exemplary embodiment of this disclosure, among other possible things includes a fan section including a plurality of fan blades rotatable about an axis. A fan case circumscribes the fan section. A core engine section includes a compressor section. A combustor is in fluid communication with the compressor section. A turbine section is in fluid communication with the combustor. A geared architecture is driven by the turbine section for rotating the fan about the axis. A bifurcation is within a passageway defined between the core engine section and the fan case defining a passageway for supply conduits to the core engine. The bifurcation includes a housing supporting a first partition spaced part from a second partition to define a buffer area therebetween, at least one opening through the first partition and the second partition defining a passageway for a supply conduit. A control device governs the flow of a purge gas into the buffer area for blocking the spread of fire through the buffer area.

In a further embodiment of the foregoing gas turbine engine assembly, includes a grommet within the opening in communication with the buffer area for communicating purge gas into the passageway for the supply conduit.

In a further embodiment of any of the foregoing gas turbine engine assemblies, includes a fire retardant material supported within the housing that is activated in response to heat to produce a flame retardant gas.

In a further embodiment of any of the foregoing gas turbine engine assemblies, the control device includes a valve that moves to an open position allowing a flow of purge gas into the buffer area responsive to a temperature detected indicative of a fire.

In a further embodiment of any of the foregoing gas turbine engine assemblies, the control device includes a fixed orifice blocked by a plug that melts responsive to exposure to heat above a defined temperature for communicating the purge gas to the buffer area.

A method of isolating a core engine portion of a gas turbine engine according to an exemplary embodiment of this disclosure, among other possible things includes defining a plurality passageways for supply conduits through a bifurcation, each of the plurality of passageways extend through partitions extending through a buffer area, defining a flow path for high pressure purge gas through the buffer area, and controlling the flow of purge gas into the buffer area responsive to detecting a temperature detected that is indicative of fire.

In a further embodiment of the foregoing method, includes the step of flowing purge gas through the buffer area to prevent the spread of fire.

In a further embodiment of any of the foregoing methods, one of the partitions includes openings in communication with the buffer area.

In a further embodiment of any of the foregoing methods, includes supporting a fire retardant material that produces a flame retardant gas responsive to exposure to a temperature above a defined level within the bifurcation.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
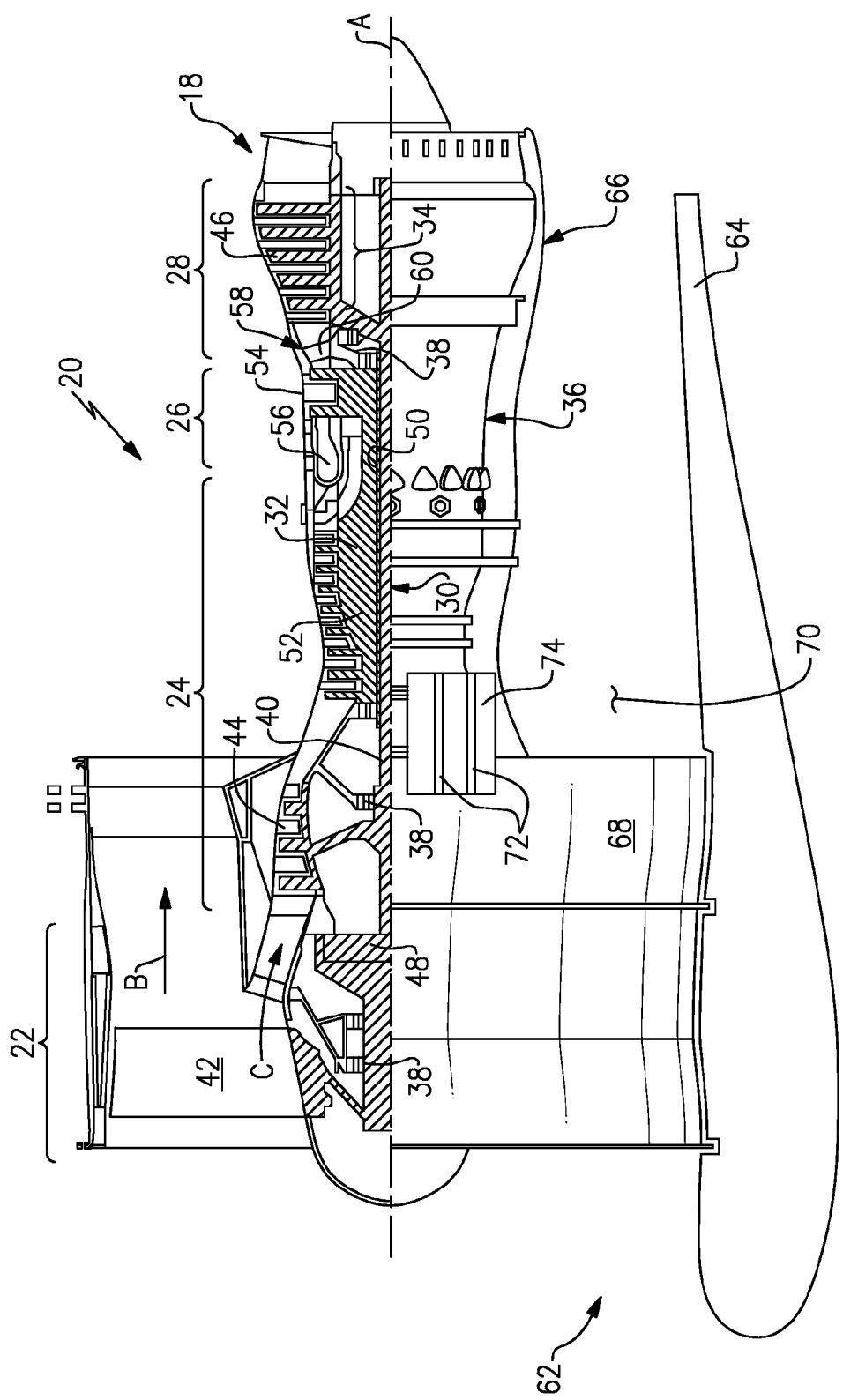
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV")

system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine includes a nacelle assembly 62 that includes an outer nacelle 64 disposed about the fan section 22 and an inner nacelle 66 that surrounds a core engine portion 18. A bypass flow passage 70 is disposed and defined between the outer nacelle structure 64 and the inner nacelle structure 66. Extending between the outer nacelle 64 and the core engine 18 is a bifurcation 74. The bifurcation 74 can provide support for the core engine 18 and also provides a space through which a plurality of supply conduits 72 may be routed. As appreciated, the bifurcation 74 is disposed within the bypass passage 70 and therefore can have an effect on propulsive airflow. It is therefore desirable to maintain and minimize a profile of the bifurcation 74 to reduce effects on the bypass flow B.

Aviation regulations require that commercial, high bypass turbofan engines have a firewall to isolate the core engine 18 from the fan section 22 and wing in the case of a fire in the core section. In this example, a firewall is provided in the bifurcation area and prevents the spread of fire from the core engine 18 to the fan case 68, outer nacelle section 64, fan section 22, and the aircraft itself.

Space within the example bifurcation 74 is limited and many supply conduits 72 are required to be routed through the bifurcation 74 to supply and control operation of the core engine section 18. The example bifurcation 74 includes features that reduce and eliminate the need for fire proof connectors, flanges and other fittings thereby providing additional space for the supply conduits 72 while minimizing the aerodynamic effects of bypass flow flowing through the bypass passage 70.

Figure 2:
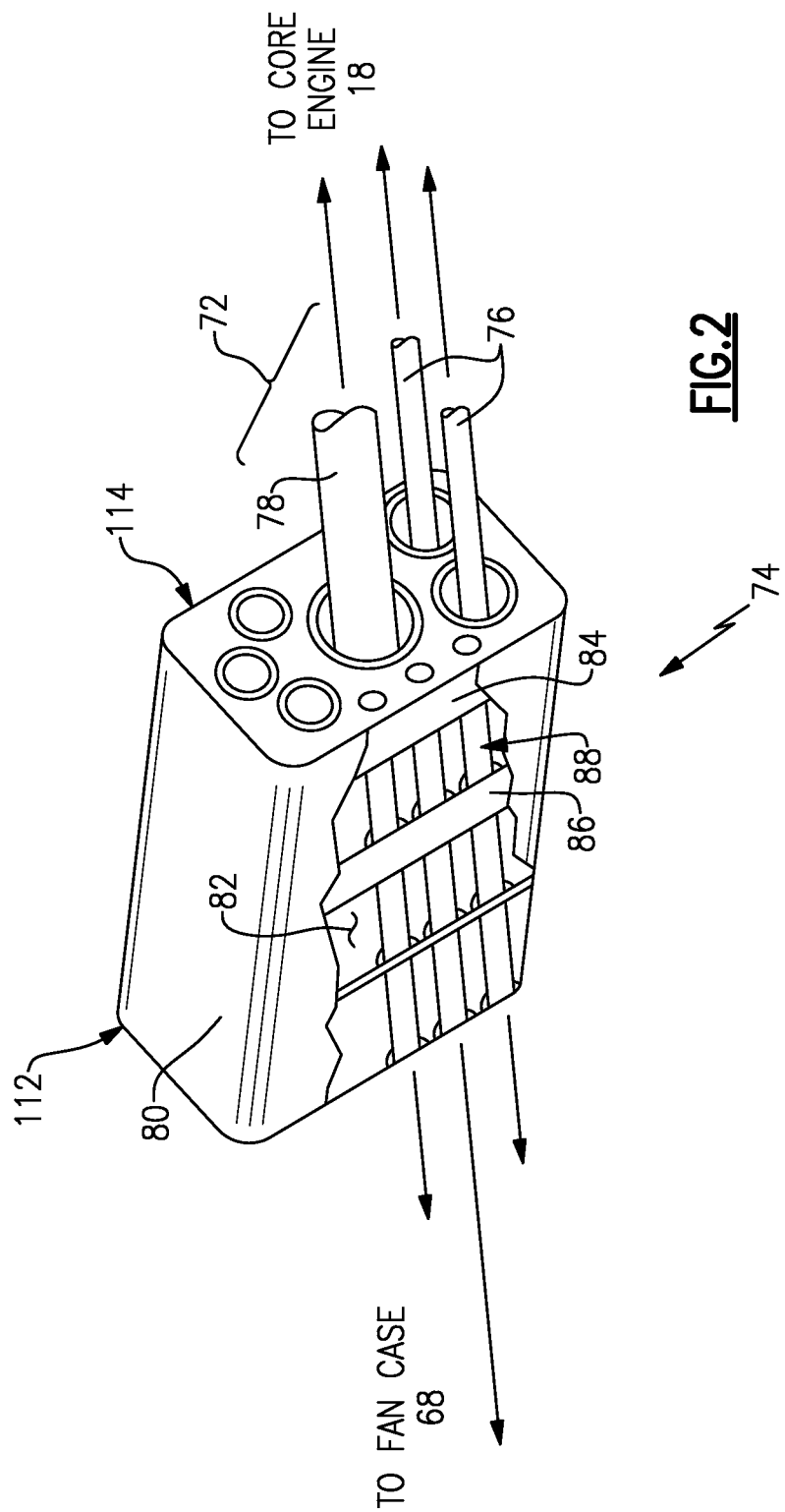
FIG. 2 is a perspective view of an example bifurcation.

Referring to FIG. 2 with continued reference to FIG. 1, the example bifurcation 74 extends between the core engine 18 and the fan case 68. As appreciated, the example bifurcation 74 is shown schematically extending between the core engine 18 and the fan case 68, the bifurcation 74 could also be part of a support structure extending radially between the inner nacelle 66 and outer nacelle 64.

The example bifurcation 74 includes a housing 80 that defines an inner cavity 82 through which the supply conduits 72 extend. The housing 80 includes an axially forward end 112 and an axially aft end 114. In this example, the supply conduits 72 include fluid conduits 78 and electrical harnesses 76. It should be understood that although fluid and electrical conduits are shown by way of example, other supply conduits 72 that communicate and provide support for operation of the core engine section 18 would be within the contemplation of this disclosure.

The example bifurcation 74 includes a first or aft partition 84 and a second or forward partition 86 that are disposed within the inner cavity 82. The aft partition 84 is spaced apart from the forward partition 86 to define a buffer area 88 therebetween. The example partitions 84, 86 can be fabricated from metal plates or from other materials compatible with the temperatures encountered within the bifurcation during operation such as for example some including floursilicone.

Figure 3:
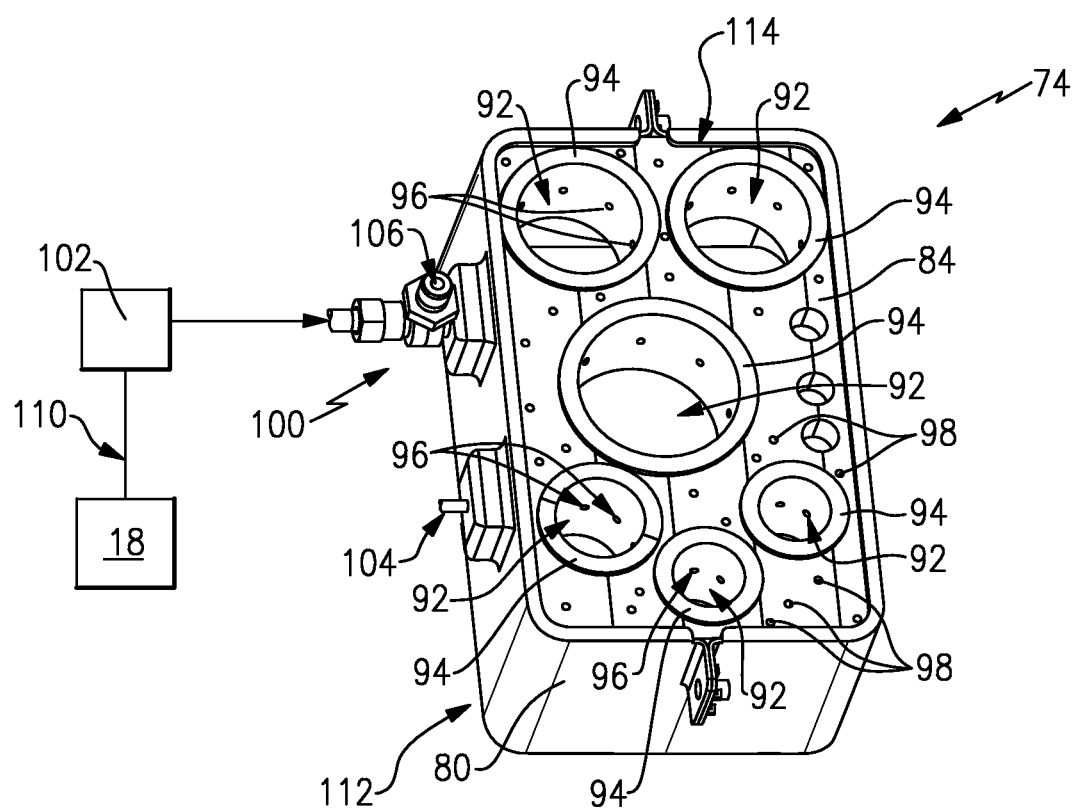
FIG. 3 is an isometric view aft view of an example bifurcation.
Figure 4:
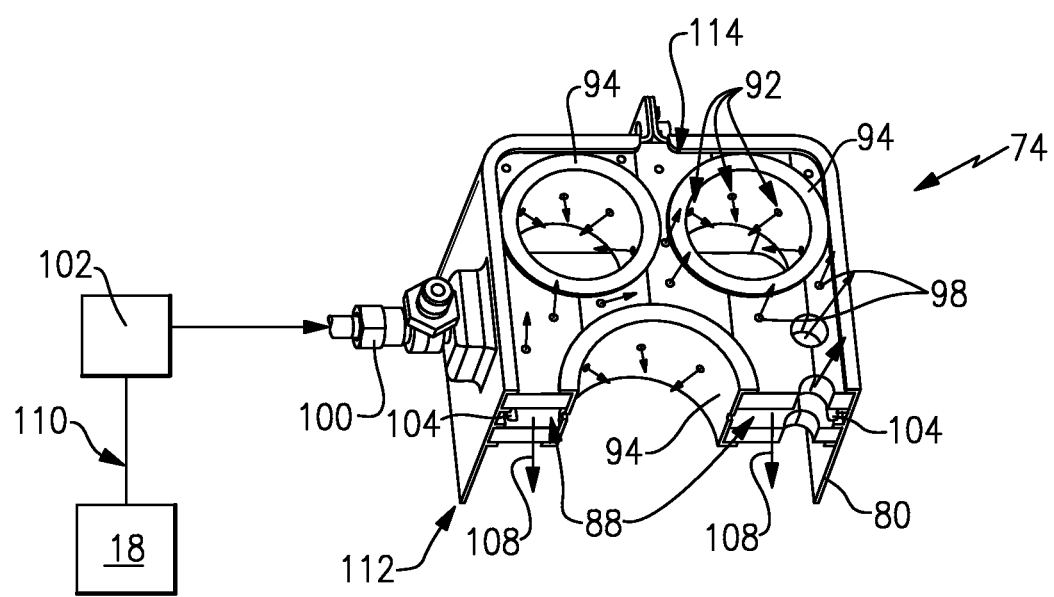
FIG. 4 is a cross-sectional view of the example bifurcation.
Figure 5:
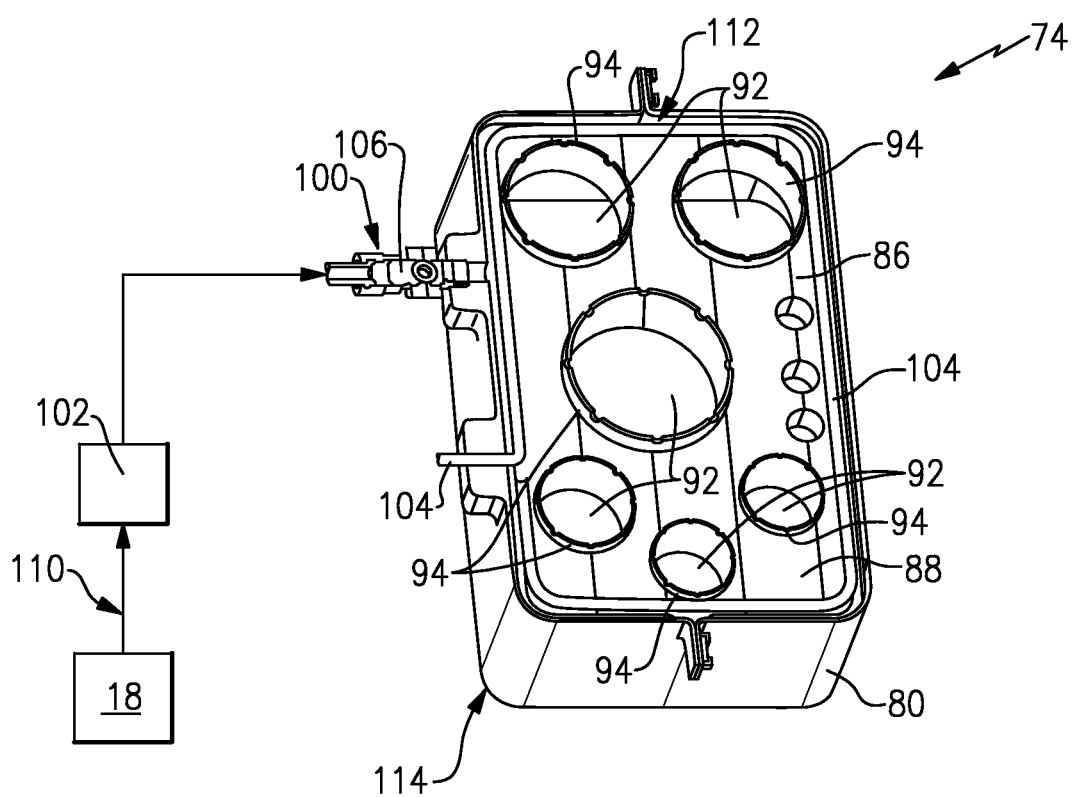
FIG. 5 is another sectional view of the example bifurcation.

Referring to FIGS. 3, 4 and 5, the example bifurcation 74 includes the aft partition 84 and the forward partition 86 that extend across the entire inner cavity 82. A plurality of passageways 92 are defined through each of the partitions and receive grommets 94. Each of the grommets 94 include openings 96 that are in communication with the buffer area 88 disposed between the aft partition 86 and the forward partition 86. The grommets 94 may also be fabricated from a material such as floursilicone.

A control device is mounted to the housing 80 and is in communication with a purge gas source 102. In this example, the purge gas supply 102 comes from a bleed airflow 110 that is obtained from the core engine section 18. In one example, the control device is a valve 100 that is normally in a closed position to prevent the flow of purge gas 102 into the buffer area 88. The valve 100 can be controllable to govern the flow of high pressure bleed air or purge gas 102 into the buffer area 88.

In another example, the control device is a plug 106 (FIG. 5) that blocks flow of the purge gas when the temperature is within a defined limit. Upon the temperature reaching a level indicative of a fire, the plug 106 will melt away and allow for the flow of purge gas 102. The purge gas 102 will then fill the buffer area 88 and be exhausted into the passageways 92 through the plurality of openings 96 defined within each of the grommets 94.

In this disclosed example, the aft partition 84 is provided aft of the second partition and includes openings 98 through which the purge gas 102 will flow. The purge case flows through the openings 98 in a direction away from the fan case 22. The purge gas 102 is of a high velocity and pressure and creates a barrier to the spread of fire through the bifurcation along the plurality of supply conduits.

Referring to FIG. 4 with continued reference to FIG. 3, purge gas 108 flows through the buffer area 88 at a high velocity and pressure to prevent fire from spreading forward past the forward partition 86. Purge gas 108 filing the buffer area 88 is at such a high velocity, that flame or excessive heat is prevented from progressing further forward to the forward end 112. Accordingly, the purge gas 108 generates a high pressure area with high pressure bleed air that generates a barrier to prevent the spread of fire to through the bifurcation to the fan case 22.

Purge gas may also be communicated into the passages 92 through the openings 96 in each of the grommets 94. Purge gas is also exhausted aft toward the core engine 18 through the openings 98 in the aft partition 84. The forward partition 86 does not include passaged for the purge gas 102. Because the forward partition 86 does not include openings 98 for purge gas a direction of flow is created toward the aft partition 84 and away from the axially forward end 112.

Referring to FIG. 5 with continued reference to FIGS. 3 and 4, a fire retardant material 104 may be disposed within the housing 80. In this example, the fire retardant material 104 is disposed within the buffer 88 and extends about an inner periphery of the inner cavity 82. The example fire retardant material 104 comprises a material that generates a fire retardant purge gas in the presence of high temperatures that cause a reaction in the fire retardant material 104. In this example, during a high temperature event the fire retardant material 104 reacts to generate a fire extinguishing gas that aids in containing and extinguishing the fire and also further generates a barrier to the spread of fire through the bifurcation 74.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A bifurcation assembly for a gas turbine engine comprising:
    a housing defining inner cavity;
    a first partition extending across the inner cavity;
    a second partition extending across the inner cavity spaced apart from the first partition to define a buffer area therebetween;
    at least one opening through the first partition and the second partition defining a passageway for a supply conduit; and
    a control device governing the flow of a purge gas into the buffer area blocking the spread of fire through the buffer area.

2. The bifurcation assembly as recited in claim 1, including a grommet within the opening and in communication with the buffer area for communicating purge gas into the passageway for the supply conduit.

3. The bifurcation assembly as recited in claim 1, wherein one of the first partition and the second partition include a plurality of openings in communication with the buffer area for communicating purge gas to a side opposite the buffer area.

4. The bifurcation assembly as recited in claim 1, including a fire retardant material supported within the housing that is activated in response to heat to produce a flame retardant gas.

5. The bifurcation assembly as recited in claim 4, wherein the fire retardant material is supported on an inner periphery of the housing within the buffer area.

6. The bifurcation assembly as recited in claim 1, wherein the control device comprises a valve that moves to an open position allowing a flow of purge gas into the buffer area responsive to a temperature detected that is indicative of a fire.

7. The bifurcation assembly as recited in claim 1, wherein the control device comprises a fixed orifice blocked by a plug that melts responsive to exposure to heat above a defined temperature for communicating the purge gas to the buffer area.

8. A gas turbine engine comprising:
    a fan section including a plurality of fan blades rotatable about an axis;
    a fan case circumscribing the fan section;
    a core engine section including a compressor section, a combustor in fluid communication with the compressor section, a turbine section in fluid communication with the combustor, and a geared architecture driven by the turbine section for rotating the fan about the axis;
    a bifurcation within a passageway defined between the core engine section and the fan case defining a passageway for supply conduits to the core engine, the bifurcation including; a housing supporting a first partition spaced part from a second partition to define a buffer area therebetween, at least one opening through the first partition and the second partition defining a passageway for a supply conduit, and a control device governing the flow of a purge gas into the buffer area for blocking the spread of fire through the buffer area.

9. The gas turbine engine assembly as recited in claim 8, including a grommet within the opening in communication with the buffer area for communicating purge gas into the passageway for the supply conduit.

10. The gas turbine engine assembly as recited in claim 8, including a fire retardant material supported within the housing that is activated in response to heat to produce a flame retardant gas.

11. The gas turbine engine assembly as recited in claim 10, wherein the control device comprises a valve that moves to an open position allowing a flow of purge gas into the buffer area responsive to a temperature detected indicative of a fire.

12. The gas turbine engine assembly as recited in claim 10, wherein the control device comprises a fixed orifice blocked by a plug that melts responsive to exposure to heat above a defined temperature for communicating the purge gas to the buffer area.

13. A method of isolating a core engine portion of a gas turbine engine comprising:
    defining a plurality passageways for supply conduits through a bifurcation, wherein each of the plurality of passageways extend through partitions extending through a buffer area;
    defining a flow path for high pressure purge gas through the buffer area; and
    controlling the flow of the high pressure purge gas into the buffer area responsive to detecting a temperature detected that is indicative of fire.

14. The method as recited in claim 13, including the step of flowing the high pressure purge gas through the buffer area to prevent the spread of fire.

15. The method as recited in claim 13, wherein one of the partitions includes openings in communication with the buffer area.

16. The method as recited in claim 13, including supporting a fire retardant material that produces a flame retardant gas responsive to exposure to a temperature above a defined level within the bifurcation.

* * * * *